United States Patent [19]

Patel et al.

[11] Patent Number: 5,873,123

[45] Date of Patent: Feb. 16, 1999

[54] PROCESSOR AND METHOD FOR TRANSLATING A NONPHYSICAL ADDRESS INTO A PHYSICAL ADDRESS UTILIZING A SELECTIVELY NONSEQUENTIAL SEARCH OF PAGE TABLE ENTRIES

[75] Inventors: Rajesh Bhikhubhai Patel; Gunendran Thuraisingham; Belliappa Manavattira Kuttanna, all of Austin, Tex.

[73] Assignees: International Business Machines Corporation, Armonk, N.Y.; Motorola, Inc., Schaumburg, Ill.

[21] Appl. No.: 670,116

[22] Filed: Jun. 25, 1996

[51] Int. Cl.⁶ .................................................. G06F 12/10
[52] U.S. Cl. ........................... 711/202; 711/207; 711/129
[58] Field of Search .................................... 711/206, 202, 711/216, 207, 129, 117

[56] References Cited

U.S. PATENT DOCUMENTS

| | | | |
|---|---|---|---|
| 4,680,700 | 7/1987 | Hester et al. | 711/206 |
| 4,774,653 | 9/1988 | James | 711/207 |
| 4,905,141 | 2/1990 | Brenza | 711/129 |
| 5,446,854 | 8/1995 | Khalidi et al. | 711/1 |
| 5,530,958 | 6/1996 | Agarwal et al. | 711/3 |
| 5,542,089 | 7/1996 | Lindsay et al. | 711/2 |
| 5,584,005 | 12/1996 | Miyaoku et al. | 711/206 |

*Primary Examiner*—Eddie P. Chan
*Assistant Examiner*—Yamir Encarnacion
*Attorney, Agent, or Firm*—Casimer K. Salys; Brian F. Russell; Andrew J. Dillon

[57] ABSTRACT

A processor and method for translating a nonphysical address into a physical address are disclosed. A determination is made if a first entry set which could contain a particular entry that associates a selected nonphysical address with a corresponding physical address assigned to a device in the data processing system is stored within a first memory of the data processing system. In response to a determination that the first entry set is not stored in the first memory, a determination is made if a second entry set which could contain the particular entry is stored within the first memory. In response to a determination that the second entry set is stored in the first memory, a search of the second entry set is initiated in order to locate the particular entry. In response to locating the particular entry, the selected nonphysical address is translated to the corresponding physical address utilizing the particular entry. In one embodiment, if the first entry set becomes available during the search of the second entry set, the first entry set is preferentially searched prior to completing the search of the second entry set.

17 Claims, 9 Drawing Sheets

PROCESSOR AND METHOD FOR TRANSLATING A NONPHYSICAL ADDRESS INTO A PHYSICAL ADDRESS UTILIZING A SELECTIVELY NONSEQUENTIAL SEARCH OF PAGE TABLE ENTRIES

BACKGROUND

1. Technical Field

The technical field of the present specification relates in general to a method and system for data processing and in particular to a method and system for determining an address within memory. Still more particularly, the technical field relates to a processor and method for translating a nonphysical address into a physical address utilizing a selectively nonsequential search of page table entries.

2. Description of the Related Art

The memory system of a typical personal computer includes one or more nonvolatile mass storage devices, such as magnetic or optical disks, and a volatile random access memory (RAM), which can include both high speed cache memory and slower main memory. In order to provide enough addresses for memory-mapped I/O as well as the data and instructions utilized by operating system and application software, the processor of a personal computer typically utilizes a virtual address space that includes a much larger number of addresses than physically exist in RAM. Therefore, to perform memory-mapped I/O or to access RAM, the processor maps the virtual addresses into physical addresses assigned to particular I/O devices or physical locations within RAM.

In the PowerPC™ RISC architecture, which is described in PowerPC™ 603 RISC Microprocessor User's Manual, available from IBM Corporation as Order No. MPR603UMU-01, the virtual address space is partitioned into a number of uniformly-sized memory pages, which each have an address descriptor called a Page Table Entry (PTE). The PTE corresponding to a particular memory page contains the virtual address of the memory page as well as the associated physical address of the page frame, thereby enabling the processor to translate any virtual address within the memory page into a physical address in memory. The PTEs, which are created in memory by the operating system, reside in Page Table Entry Groups (PTEGs), which can each contain, for example, up to eight PTEs. According to the PowerPC™ architecture, a particular PTE can reside in any location in either of a primary PTEG or a secondary PTEG, which are selected by performing primary and secondary hashing functions, respectively, on the virtual address of the memory page. In order to improve performance, the processor also includes a Translation Lookaside Buffer (TLB) that stores the most recently accessed PTEs for quick access.

Although a virtual address can usually be translated by reference to the TLB because of the locality of reference, if a TLB miss occurs, that is, if the PTE required to translate the virtual address of a particular memory page into a physical address is not resident within the TLB, the processor must search the PTEs in memory in order to reload the required PTE into the TLB and translate the virtual address of the memory page. Conventionally, the search, which can be performed either in hardware or by a software interrupt handler, sequentially examines the contents of the primary PTEG, and if no match is found in the primary PTEG, the contents of the secondary PTEG. If a match is found in either the primary or the secondary PTEG, history bits for the memory page are updated, if required, and the PTE is loaded into the TLB in order to perform the address translation. However, if no match is found in either the primary or secondary PTEG, a page fault exception is reported to the processor and an exception handler is executed to load the requested memory page from nonvolatile mass storage into memory.

Although PTE searches are infrequently required, PTE searches utilizing the above-described sequential search of the primary and secondary PTEGs do slow processor performance, particularly when the PTE searches are performed in software. This performance penalty is due, for example, to the delay incurred when the primary PTEG resides in main memory, but the secondary PTEG resides in high speed cache memory. Utilizing the conventional sequential search of the primary and secondary PTEGs, the search of the secondary PTEG is delayed until the primary PTEG is loaded into cache memory and searched. As should thus be apparent, an improved method for translating a virtual (nonphysical) address into a physical address is needed that efficiently searches PTEGs in memory in response to a TLB miss.

SUMMARY

It is therefore one object of the present disclosure to provide an improved method and system for data processing.

It is another object of the present disclosure to provide an improved method and system for determining an address within memory.

It is yet another object of the present disclosure to provide a processor and method for translating a nonphysical address into a physical address utilizing a nonsequential search of page table entries.

The foregoing objects are achieved as is now described. A processor and method for translating a nonphysical address into a physical address are disclosed. A determination is made if a first entry set which could contain a particular entry that associates a selected nonphysical address with a corresponding physical address assigned to a device in the data processing system is stored within a first memory of the data processing system. In response to a determination that the first entry set is not stored in the first memory, a determination is made if a second entry set which could contain the particular entry is stored within the first memory. In response to a determination that the second entry set is stored in the first memory, a search of the second entry set is initiated in order to locate the particular entry. In response to locating the particular entry, the selected nonphysical address is translated to the corresponding physical address utilizing the particular entry. In one embodiment, if the first entry set becomes available during the search of the second entry set, the first entry set is preferentially searched prior to completing the search of the second entry set.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
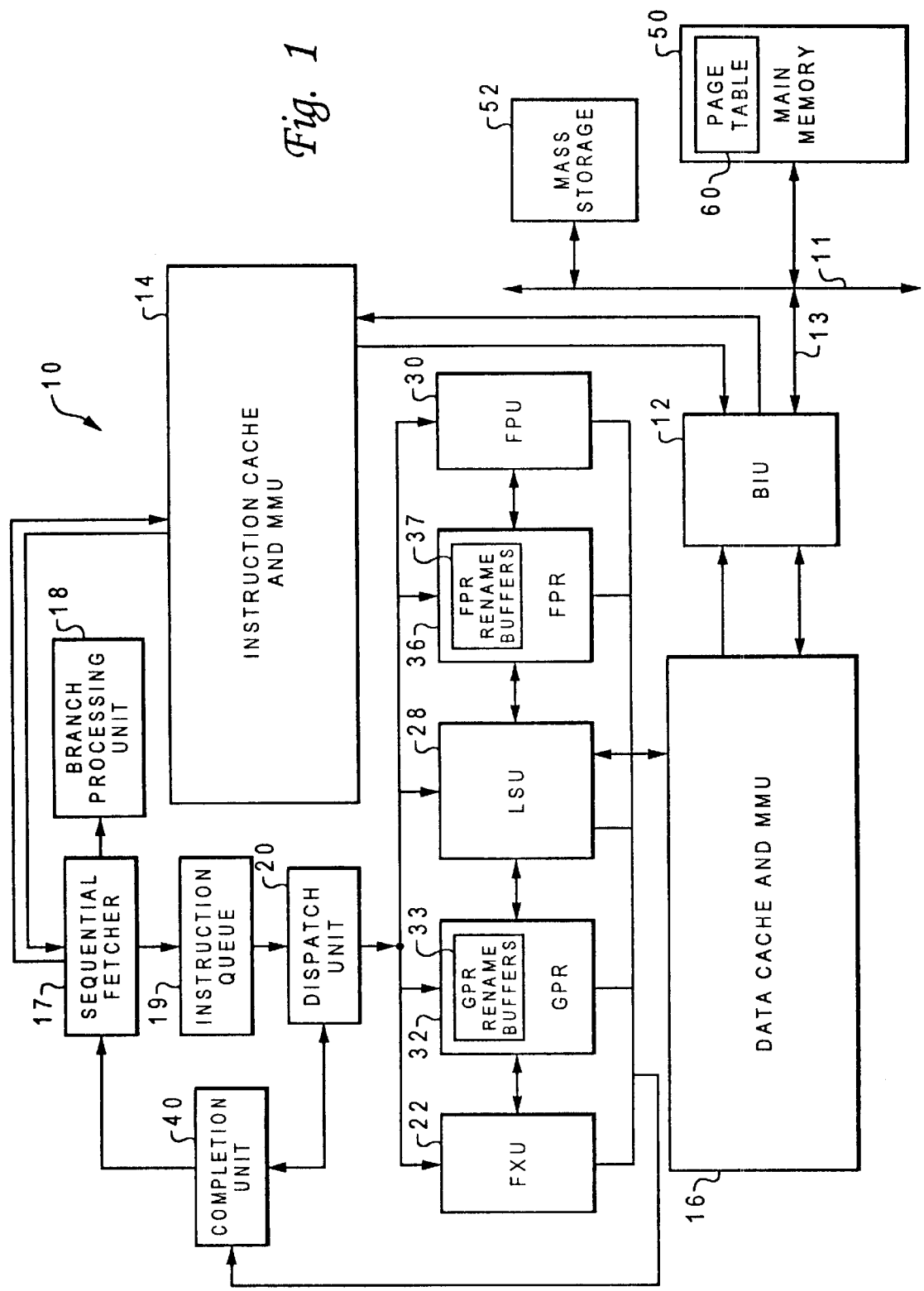
FIG. 1 illustrates an illustrative embodiment of a data processing system which utilizes the improved method for translating a nonphysical address into a physical address described herein.

With reference now to the figures and in particular with reference to FIG. 1, there is depicted a block diagram of an illustrative embodiment of a data processing system for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate from the following description that other suitable processors can be utilized. As illustrated in FIG. 1, processor 10 is coupled to system bus 11 via bus interface unit (BIU) 12 and processor bus 13, which like system bus 11 includes address, data, and control buses. BIU 12 controls the transfer of information between processor 10 and other devices coupled to system bus 11, such as main memory 50 and nonvolatile mass storage 52, by participating in bus arbitration. The data processing system illustrated in FIG. 1 preferably includes other unillustrated devices coupled to system bus 11, which are not necessary for an understanding of the following description and are accordingly omitted for the sake of simplicity.

BIU 12 is connected to instruction cache and MMU (Memory Management Unit) 14 and data cache and MMU 16 within processor 10. High-speed caches, such as those within instruction cache and MMU 14 and data cache and MMU 16, enable processor 10 to achieve relatively fast access times to a subset of data or instructions previously transferred from main memory 50 to the caches, thus improving the speed of operation of the data processing system. Data and instructions stored within the data cache and instruction cache, respectively, are identified and accessed by address tags, which each comprise a selected number of high-order bits of the physical address of the data or instructions in main memory 50. Instruction cache and MMU 14 is further coupled to sequential fetcher 17, which fetches instructions for execution from instruction cache and MMU 14 during each cycle. Sequential fetcher 17 transmits branch instructions fetched from instruction cache and MMU 14 to branch processing unit (BPU) 18 for execution, but temporarily stores sequential instructions within instruction queue 19 for execution by other execution circuitry within processor 10.

In the depicted illustrative embodiment, in addition to BPU 18, the execution circuitry of processor 10 comprises multiple execution units for executing sequential instructions, including fixed-point unit (FXU) 22, load-store unit (LSU) 28, and floating-point unit (FPU) 30. Each of execution units 22, 28, and 30 typically executes one or more instructions of a particular type of sequential instructions during each processor cycle. For example, FXU 22 performs fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either the data cache within data cache and MMU 16 or main memory 50) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each sequential instruction is processed at five distinct pipeline stages, namely, fetch, decode/dispatch, execute, finish, and completion.

During the fetch stage, sequential fetcher 17 retrieves one or more instructions associated with one or more memory addresses from instruction cache and MMU 14. Sequential instructions fetched from instruction cache and MMU 14 are stored by sequential fetcher 17 within instruction queue 19. In contrast, sequential fetcher 17 removes (folds out) branch instructions from the instruction stream and forwards them to BPU 18 for execution. BPU 18 includes a branch prediction mechanism, which in one embodiment comprises a dynamic prediction mechanism such as a branch history table, that enables BPU 18 to speculatively execute unresolved conditional branch instructions by predicting whether or not the branch will be taken.

During the decode/dispatch stage, dispatch unit 20 decodes and dispatches one or more instructions from instruction queue 19 to execution units 22, 28, and 30, typically in program order. In addition, dispatch unit 20 allocates a rename buffer within GPR rename buffers 33 or FPR rename buffers 37 for each dispatched instruction's result data. Upon dispatch, instructions are also stored within the multiple-slot completion buffer of completion unit 40 to await completion. According to the depicted illustrative embodiment, processor 10 tracks the program order of the dispatched instructions during out-of-order execution utilizing unique instruction identifiers.

During the execute stage, execution units 22, 28, and 30 execute instructions received from dispatch unit 20 opportunistically as operands and execution resources for the indicated operations become available. Each of execution units 22, 28, and 30 are preferably equipped with a reservation station that stores instructions dispatched to that execution unit until operands or execution resources become available. After execution of an instruction has terminated, execution units 22, 28, and 30 store data results, if any, within either GPR rename buffers 33 or FPR rename buffers 37, depending upon the instruction type. Then, execution units 22, 28, and 30 notify completion unit 40 which instructions have finished execution. Finally, instructions are completed in program order out of the completion buffer of completion unit 40. Instructions executed by FXU 22 and FPU 30 are completed by transferring data results of the instructions from GPR rename buffers 33 and FPR rename buffers 37 to GPRs 32 and FPRs 36, respectively. Load and store instructions executed by LSU 28 are completed by transferring the finished instructions to a completed store queue or a completed load queue from which the load and store operations indicated by the instructions will be performed.

In the depicted illustrative embodiment, processor 10 utilizes a 32-bit address bus and therefore has a 4 Gbyte ($2^{32}$) virtual address space. The 4 Gbyte virtual address space is partitioned into a number of 4 Kbyte memory pages, which each have an Page Table Entry (PTE) address descriptor that associates the virtual address of the memory page with the corresponding physical address of the memory page in main memory 50. As illustrated in FIG. 1, the PTEs describing the memory pages resident within main memory 50 together comprise page table 60, which is created by the operating system of the data processing system utilizing one of two hashing functions that are described in greater detail below.

Figure 2:
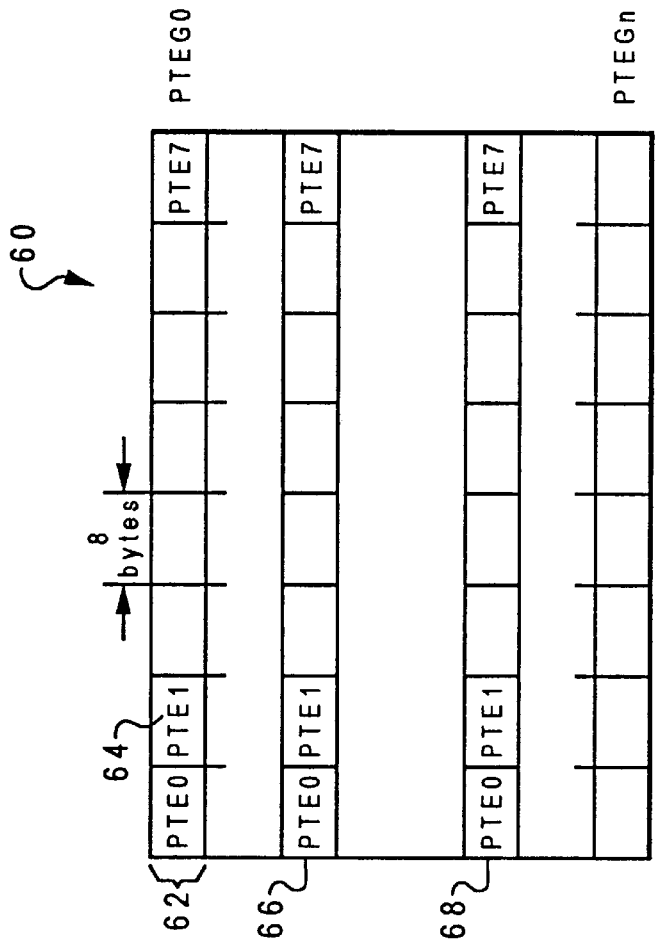
FIG. 2 depicts an illustrative embodiment of a page table in memory, which contains a number of Page Table Entries (PTEs) that each associate a virtual address of a memory page with a physical address.

Referring now to FIG. 2, there is depicted a more detailed block diagram representation of page table 60 in main memory 50. Page table 60 is a variable-sized data structure comprised of a number of Page Table Entry Groups (PTEGs) 62, which can each contain up to 8 PTEs 64. As illustrated, each PTE 64 is eight bytes in length; therefore, each PTEG 62 is 64 bytes long. Each PTE 64 can be assigned to any location in either of a primary PTEG 66 or a secondary PTEG 68 in page table 60 depending upon whether a primary hashing function or a secondary hashing function is utilized by the operating system to set up the associated memory page in memory. The addresses of primary PTEG 66 and secondary PTEG 68 serve as entry points for page table search operations, which are described in detail below with reference to FIGS. 6A–6D.

Figure 3:
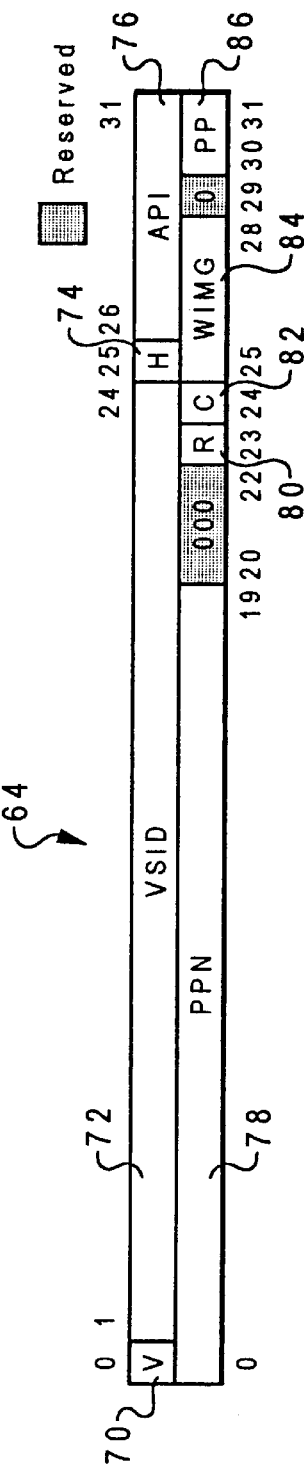
FIG. 3 illustrates a pictorial representation of a Page Table Entry (PTE) within the page table depicted in FIG. 4.

With reference now to FIG. 3, there is illustrated a pictorial representation of the structure of each PTE 64 within page table 60. As illustrated, the first four bytes of each 8-byte PTE 64 include a valid bit 70 for indicating whether PTE entry 64 is valid, a Virtual Segment ID (VSID) 72 for specifying the high-order bits of a virtual page number, a hash function identifier (H) 74 for indicating which of the primary and secondary hash functions was utilized to create PTE 64, and an Abbreviated Page Index (API) 76 for specifying the low order bits of the virtual page number. Hash function identifier 74 and the virtual page number specified by VSID 72 and API 76 are used to locate a particular PTE 64 during a search of page table 60 or the Translation Lookaside Buffers (TLBs) maintained by instruction cache and MMU 14 and data cache and MMU 16, which are described below. Still referring to FIG. 3, the second four bytes of each PTE 64 include a Physical Page Number (PPN) for identifying the corresponding physical memory page, referenced (R) bit 80 and changed (C) bit 82 for keeping history information about the memory page, memory access attribute bits 84 for specifying memory update modes for the memory page, and page protection (PP) bits 86 for defining access protection constraints for the memory page.

Figure 4:
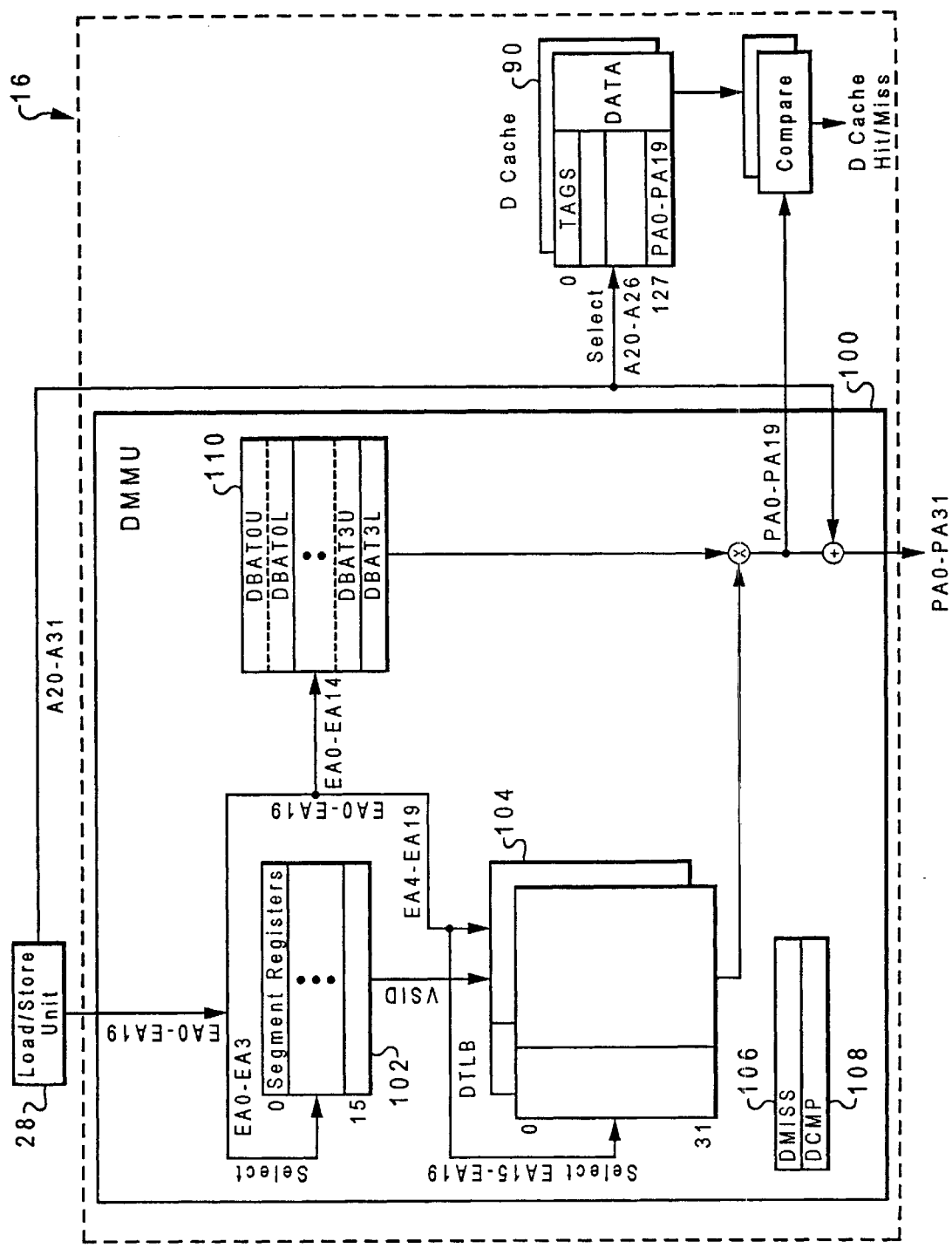
FIG. 4 depicts a more detailed block diagram of the data cache and MMU illustrated in FIG. 1.

Referring now to FIG. 4, there is depicted a more detailed block diagram representation of data cache and MMU 16 of processor 10. In particular, FIG. 4 illustrates the address translation mechanism utilized by data cache and MMU 16 to translate effective addresses (EAs) specified within data access requests received from LSU 28 into physical addresses assigned to locations within main memory 50 or to devices within the data processing system that support memory-mapped I/O. In order to permit simultaneous address translation of data and instruction addresses and therefore enhance processor performance, instruction cache and MMU 14 contains a corresponding address translation mechanism for translating EAs contained within instruction requests received from sequential fetcher 17 into physical addresses within main memory 50.

As depicted in FIG. 4, data cache and MMU 16 includes a data cache 90 and a data MMU (DMMU) 100. In the depicted illustrative embodiment, data cache 90 comprises a two-way set associative cache including 128 cache lines having 32 bytes in each way of each cache line. Thus, only 4 PTEs within a 64-byte PTEG 62 can be accommodated within a particular cache line of data cache 90. Each of the 128 cache lines corresponds to a congruence class selected utilizing address bits 20–26, which are identical for both effective and physical addresses. Data mapped into a particular cache line of data cache 90 is identified by an address tag comprising bits 0–19 of the physical address of the data within main memory 50.

As illustrated, DMMU 100 contains segment registers 102, which are utilized to store the Virtual Segment Identifiers (VSIDs) of each of the sixteen 256-Mbyte regions into which the 4 Gbyte virtual address space of processor 10 is subdivided. A VSID stored within a particular segment register is selected by the 4 highest-order bits (bits 0–3) of an EA received by DMMU 100. DMMU 100 also includes Data Translation Lookaside Buffer (DTLB) 104, which in the depicted embodiment is a two-way set associate cache for storing copies of recently-accessed PTEs. DTLB 104 comprises 32 lines, which are indexed by bits 15–19 of the EA. Multiple PTEs mapped to a particular line within DTLB 104 by bits 15–19 of the EA are differentiated by an address tag comprising bits 10–14 of the EA. In the event that the PTE required to translate a virtual address is not stored within DTLB 104, DMMU 100 stores that 32-bit EA of the data access that caused the DTLB miss within DMISS register 106. In addition, DMMU 100 stores the VSID, H bit, and API corresponding to the EA within DCMP register 108 for comparison with the first 4 bytes of PTEs during a table search operation. DMMU 100 further includes Data Block Address Table (DBAT) array 110, which is utilized by DMMU 100 to translate the addresses of data blocks (i.e., variably-sized regions of virtual memory) and is accordingly not discussed further herein.

Figure 5:
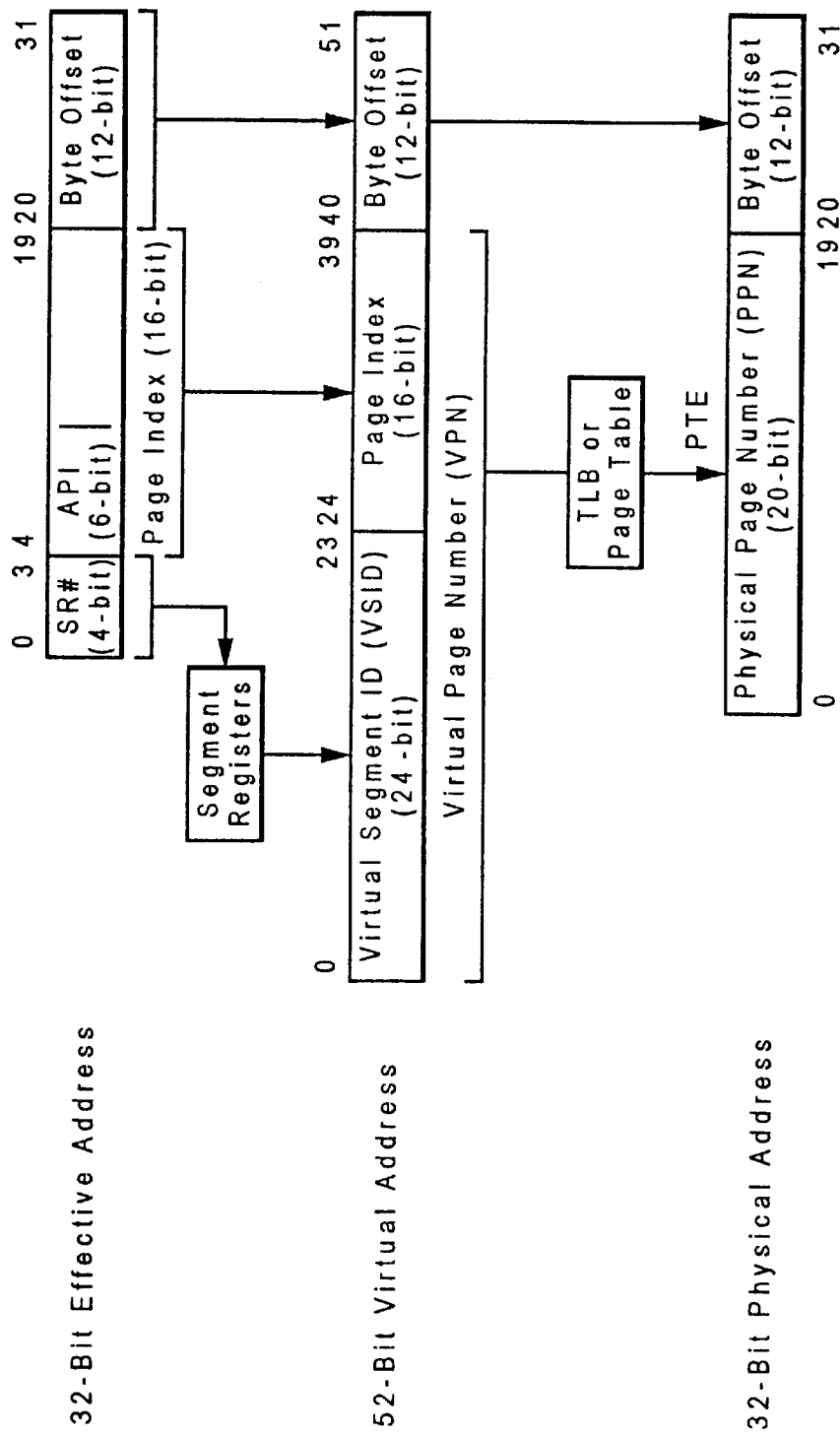
FIG. 5 is a high level flow diagram of the method of translating memory page addresses employed by the data processing system illustrated in FIG. 1.

With reference now to FIG. 5, there is illustrated a high-level flow diagram of the address translation process utilized by processor 10 to translate EAs into physical addresses. As depicted in FIGS. 4 and 5, LSU 28 transmits the 32-bit EA of each data access request to data cache and MMU 16. Bits 0–3 of the 32-bit EA are utilized to select one of the 16 segment registers 102 in DMMU 100. The 24-bit VSID stored in the selected one of segment registers 102, which together with the 16-bit page index and 12-bit byte offset of the EA form a 52-bit virtual address, is passed to DTLB 104. Bits 15–19 of the EA then select two PTEs stored within a particular line of DTLB 104. Bits 10–14 of the EA are compared to the address tags associated with each of the selected PTEs and the VSID field and API field (bits 4–9 of the EA) are compared with corresponding fields in the PTEs. In addition, the valid (V) bit of each PTE is checked. If the comparisons indicate that a match is found, the PP bits of the matching PTE are checked for an exception, and if these bits do not cause an exception, the 20-bit PPN (Physical Page Number) contained in the matching PTE is passed to data cache 90 to determine if the requested data results in a cache hit. As shown in FIG. 5, concatenating the 20-bit PPN with the 12-bit byte offset specified by the EA produces a 32-bit physical address of the requested data in main memory 50.

Although 52-bit virtual addresses are usually translated into physical addresses by reference to DTLB 104, if a DTLB miss occurs, that is, if the PTE required to translate the virtual address of a particular memory page into a physical address is not resident within DTLB 104, DMMU 100 searches page table 60 in main memory 50 in order to reload the required PTE into DTLB 104 and translate the virtual address of the memory page. In contrast to conventional table search operations, which sequentially examine the contents of each PTEG in which the required PTE could reside, the table search operation performed by DMMU 100 checks the PTEs within the primary and secondary PTEGs in a selectively nonsequential order such that processor performance is enhanced.

Referring now to FIGS. 6A–6D, there is depicted an illustrative embodiment of a method of searching page table 60 to locate a particular PTE required to translate a virtual address into a physical address. As noted above, each PTEG within page table 60 comprises 8 8-byte PTEs. Therefore, when PTEs are loaded into data cache 90 from main memory 50 for comparison with the virtual address, the PTEs within the primary and secondary PTEGs map to four 32-byte cache lines within data cache 90. Accordingly, in the following description, P0 refers to PTE0–PTE3 of the primary PTEG, which map to a first cache line, P1 refers to PTE4–PTE7 of the primary PTEG, which map to a second cache line, S0 refers to PTE0–PTE3 of the secondary PTEG, which map to a third cache line, and S1 refers to PTE4–PTE7 of the secondary PTEG, which map to a fourth cache line; Each of the sets P0, P1, S0, and S1 is a candidate to contain the particular PTE required to translate the virtual address into a physical address.

As illustrated, the process begins at block 150 and thereafter proceeds to block 152, which as described above depicts a determination of whether or not the required PTE resides within DTLB 104. If so, the process proceeds to block 154, which illustrates translating the virtual address into a physical address utilizing the matching PTE contained within DTLB 104 in the manner which has been described. Thereafter, the process terminates at block 156.

Returning to block 152, if a determination is made that the required PTE does not reside within DTLB 104, the process proceeds to block 158, which illustrates DMMU 100 requesting the next PTE in set P0, in this case PTE0, from data cache 90. Next, at block 160, a determination is made whether or not the PTE request results in a cache hit, that is, whether set P0 resides in data cache 90. If so, the process proceeds to block 162, which illustrates a determination of whether or not the VSID and other fields of the requested PTE match the corresponding fields of the virtual address. If so, the process proceeds through page connector A to block 153, which depicts loading the matching PTE into DTLB 104. Thereafter, the virtual address is translated at block 154 by reference to the matching PTE and the process terminates at block 156. However, if fields within the requested PTE do not match the corresponding portions of the virtual address, the process passes to block 164, which depicts a determination of whether or not the PTE compared at block 162 is PTE3, the final PTE in set P0. If not, the process returns through page connector B to block 158 and following blocks in order to continue the search of set P0 for the required PTE. If, however, a determination is made a block 164 that the search of set P0 is complete, the process passes to block 166, which depicts a determination of whether or not the search of set P1 is complete. If not, the process passes through page connector C to block 182, which is described below. If a determination is made at block 166 that the search of set P1 is complete, the process proceeds to block 168, which depicts a determination of whether or not the search of set S0 is complete. If not, the process passes through page connector E to block 212, which is described below. If, however, a determination is made at block 168 that the search of S0 is complete, the process passes to block 170, which depicts a determination if the search of set S1 is complete. If not, the process passes through page connector G to block 242, which is described below. However, if a determination is made at block 170 that the search of set S1 is complete, the process passes to block 264 which illustrates DMMU 100 reporting a page fault exception because the required PTE is not contained within either the primary PTEG or secondary PTEG. The process then passes from block 264 to block 266, which depicts DMMU 100 loading the requested page from the backing store within mass storage 52 as part of the page fault exception handler. Thereafter, the process terminates at block 268.

Figure 6A:
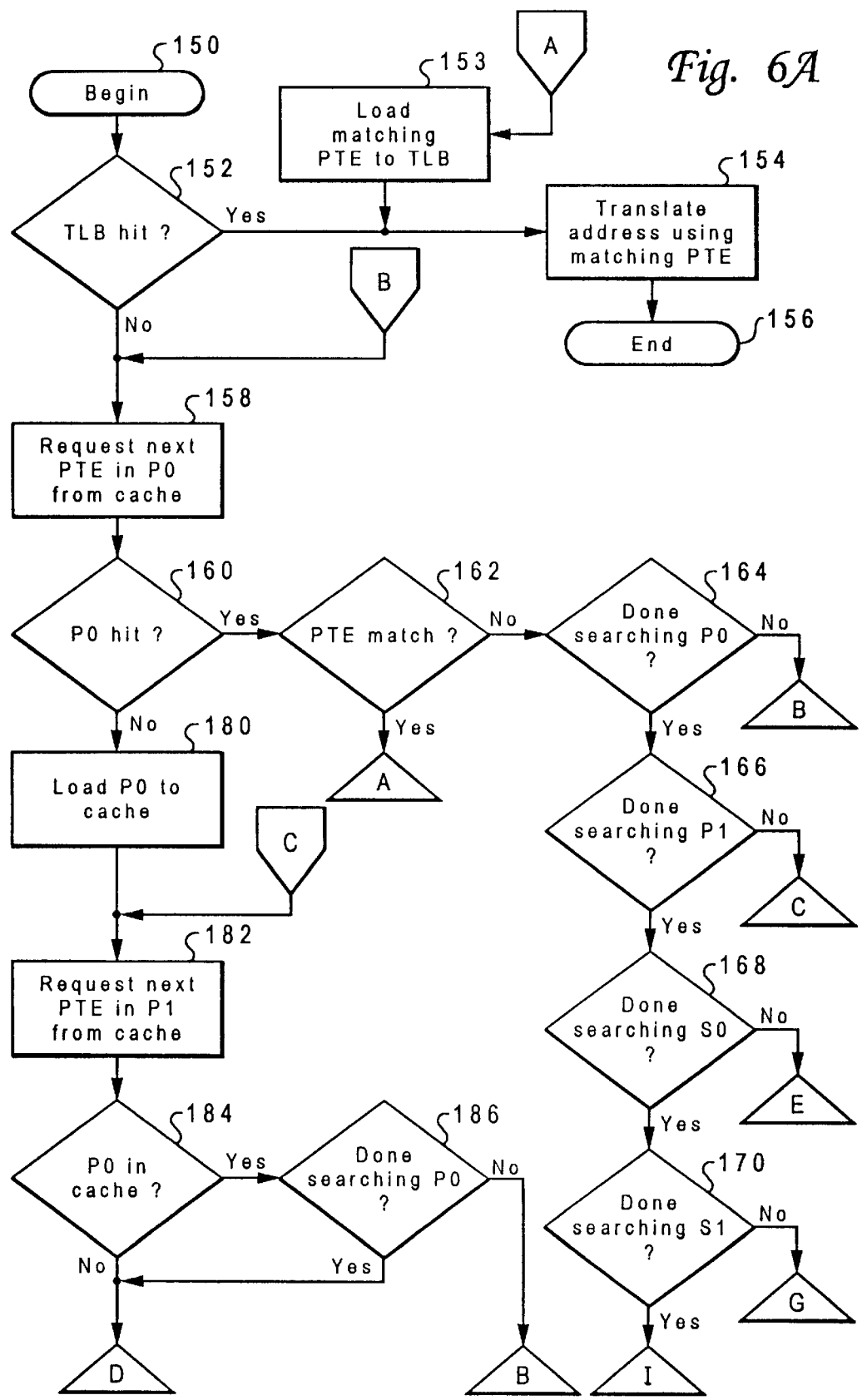
FIGS. 6A–6D together depict a flowchart of an illustrative embodiment of a method of performing a selectively non-sequential page table search operation.

Referring again to block 160 of FIG. 6A, if a determination is made that the request for a PTE in set P0 results in a cache miss, the process proceeds to block 180, which depicts DMMU 100 transmitting a request to load P0 into data cache 90 to main memory 50. The process proceeds from block 180 to block 182, which illustrates DMMU 100 requesting the next PTE in set P1 from data cache 90. Thus, while DMMU 100 is waiting for set P0 to be loaded into data cache 90, DMMU 100 attempts to search set P1 if set P1 is resident within data cache 90. The process then passes to block 184, which illustrates a determination of whether or not set P0 has been loaded into data cache 90 from main memory 50. If so, the process passes to block 186, which depicts a determination of whether or not the search of set P0 has been completed. If so, the process proceeds from block 186 to page connector D to block 190 of FIG. 6B. However, if a determination is made at block 186 that the search of set P0 has not been completed, the process returns to block 158, which has been described. Thus, as depicted at blocks 184–186, the depicted method defers searching set P1 if set P0 becomes available because the required PTE is statistically more likely to reside in P0.

Figure 6B:
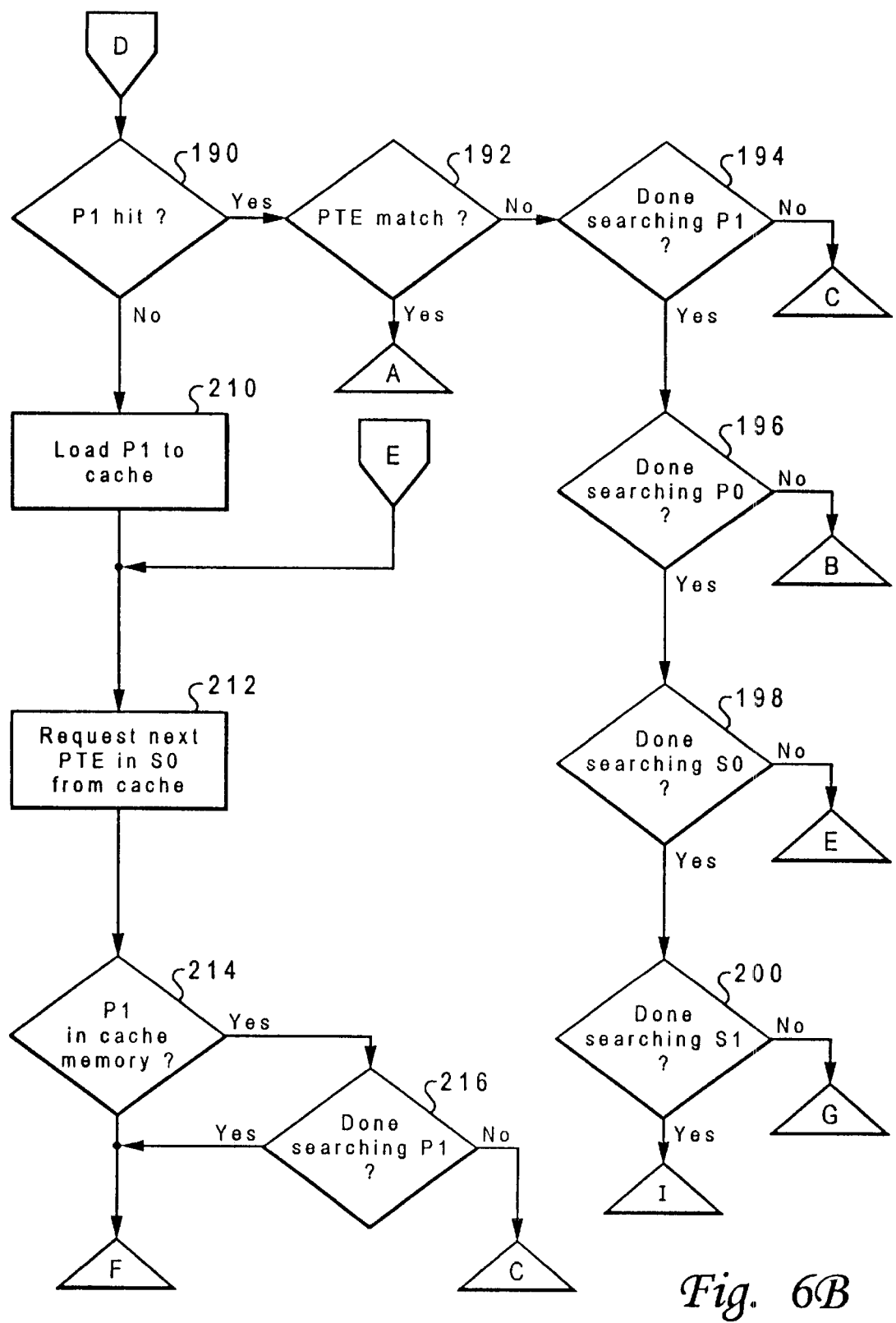
Figure 6C:
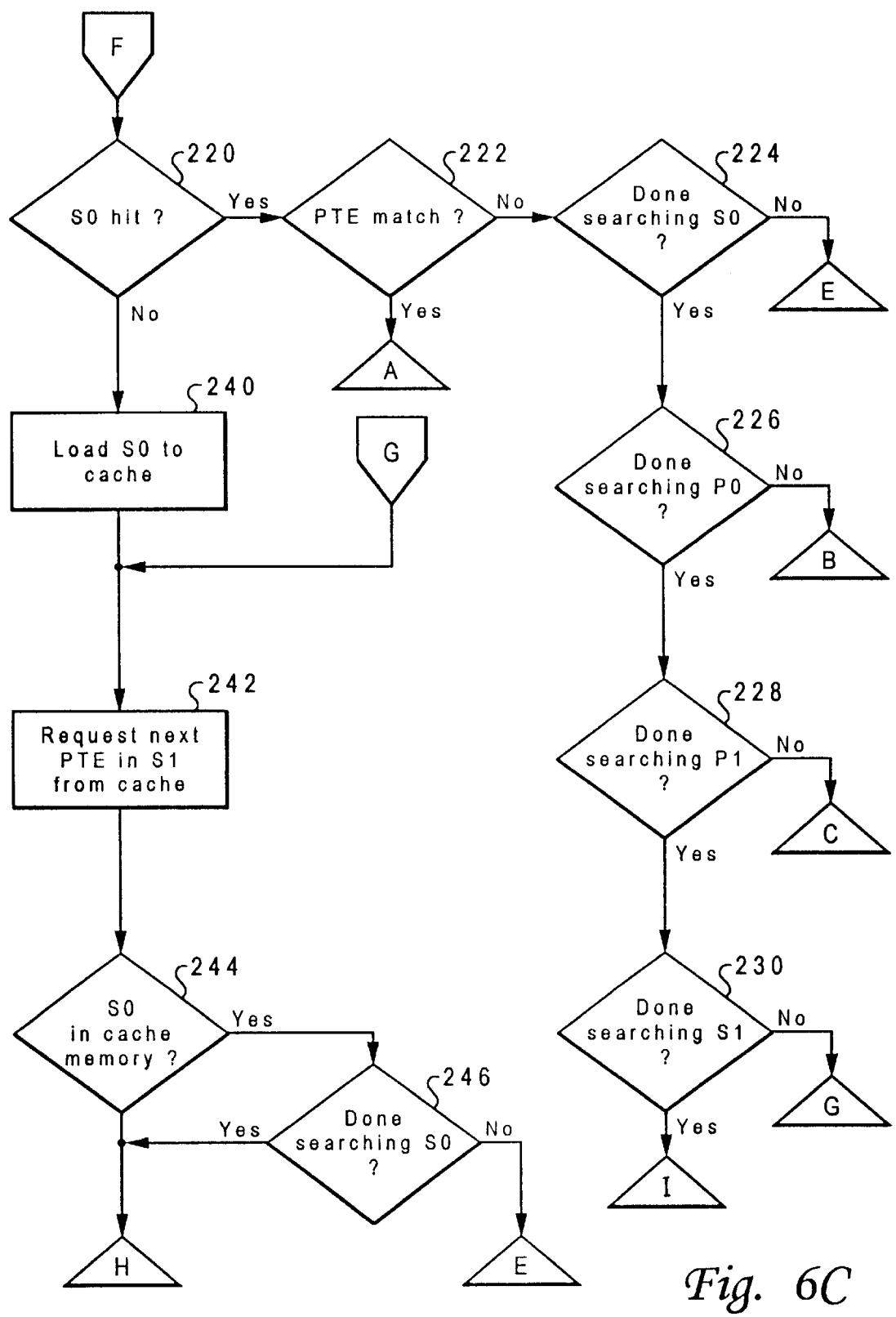
Figure 6D:
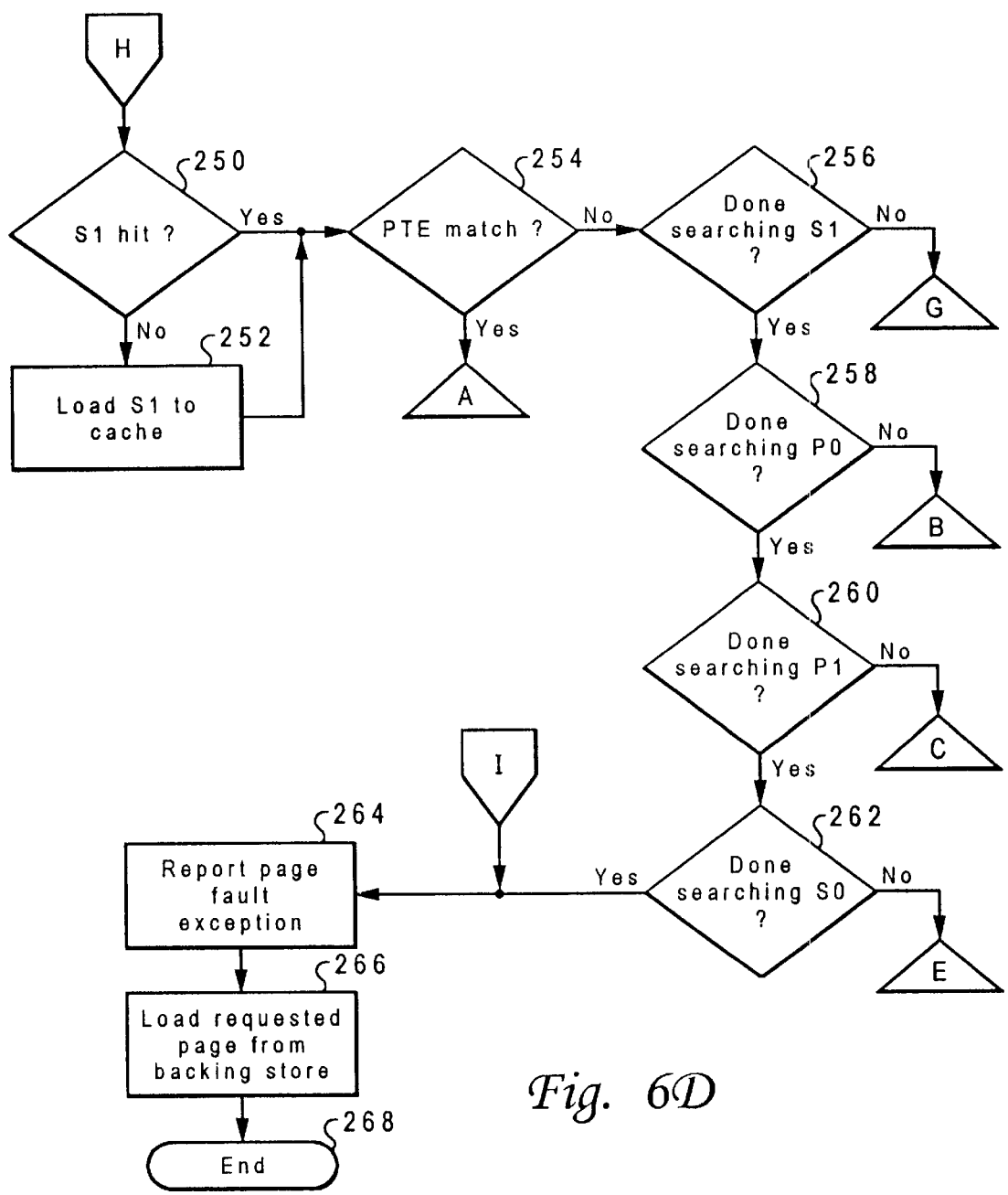

With reference now to block 190 of FIG. 6B, a determination is made whether or not the request for a PTE within set P1 results in a cache hit. If so, the process passes from block 190 to block 192, which depicts determining whether or not a match exists between the requested PTE within set P1 and the virtual address to be translated. If so, the process passes through page connector A to block 153 and following blocks of FIG. 6A as has been described. In response to a determination that the requested PTE in set P1 does not match the virtual address, the process proceeds to block 194, which depicts a determination of whether or not the search of set P1 is complete, that is, whether the requested PTE is PTE7 of the primary PTEG. In response to a determination that the search of set P1 is not complete, the process returns through page connector C to block 182 of FIG. 6A, which as described above illustrates requesting the next PTE within set P1 from data cache 90. The process then proceeds to block 184, which depicts a determination of whether or not set P0 is resident within data cache 90. If so, the process passes to block 186, which illustrates a determination of whether or not the search of set P0 is complete. If so, the process returns to block 190 through page connector D in order to continue the search of set P1. However, if the search of set P0 is not complete, for example, if the initial request for a PTE within set P0 resulted in a cache miss at block 160, the process returns through page connector B to block 158 in order to perform the search of P0 depicted at blocks 158–164. Thus, the illustrated method preferentially searches PTE sets in which the required PTE has a higher statistical likelihood of residing, but searches PTE sets in which the required PTE has a lower statistical likelihood of residing during cache line fills of the PTE sets in which the required PTE is more likely to reside.

Referring again to block 194 of FIG. 6B, if a determination is made that the search of set P1 is complete, the process proceeds to blocks 196–200, which depict the process determining the PTE set in which the required PTE has the highest likelihood of residing and which has not been completely searched. Thus, if the search of set P0, the PTE set in which the required PTE is most likely to reside, is not complete, the process passes to block 158 of FIG. 6A via page connector B in the manner which has been described. If the search of set P0 has been completed, however, and a determination is made at block 198 that the search of set S0, the first four PTEs within the secondary PTEG, has not been completed, the process proceeds through page connector E to block 212, which is described below. However, if a determination is made that the search of set S0 is complete, the process passes to block 200, which depicts a determination of whether or not the search of set S1 is complete. If not, the process proceeds through page connector G to block 242 of FIG. 6C. However, if a determination is made that a search of all PTE sets has been completed, the process proceeds through page connector I to blocks 264 and 266 of FIG. 6D, which have been described.

Referring again to block 190 of FIG. 6B, if a determination is made that a request for a PTE within set P1 results in a cache miss, the process proceeds to block 210–230, which illustrate initiating a search of S0 while set P1 is loaded into data cache 90 from page table 60 in main memory 50. Like the search of set P1 depicted at blocks 182–200, the search of set S0 depicted at blocks 212–230 is interrupted at blocks 214–216 if set P1 is resident within data cache 90 and the search of set P1 is not complete.

Following the completion of the search of set S0 at blocks 212–230, or in response to a S0 cache miss at block 220 and S0 load request at block 240, the process passes to blocks 242–262, which illustrate a similar search of set S1. As before, if a PTE match is found at block 254, the process passes to block 153 and following blocks of FIG. 6A, which illustrate translating the virtual address utilizing the matching PTE. If, however, no match is found within set S1 or sets P0, P1, and S0, the process passes from block 262 to blocks 264 and 266, which illustrate DMMU 100 reporting a page fault exception and loading the requested memory page from the backing store in mass storage 52 to main memory 50. Thereafter, the process terminates at block 268.

Figure 7:
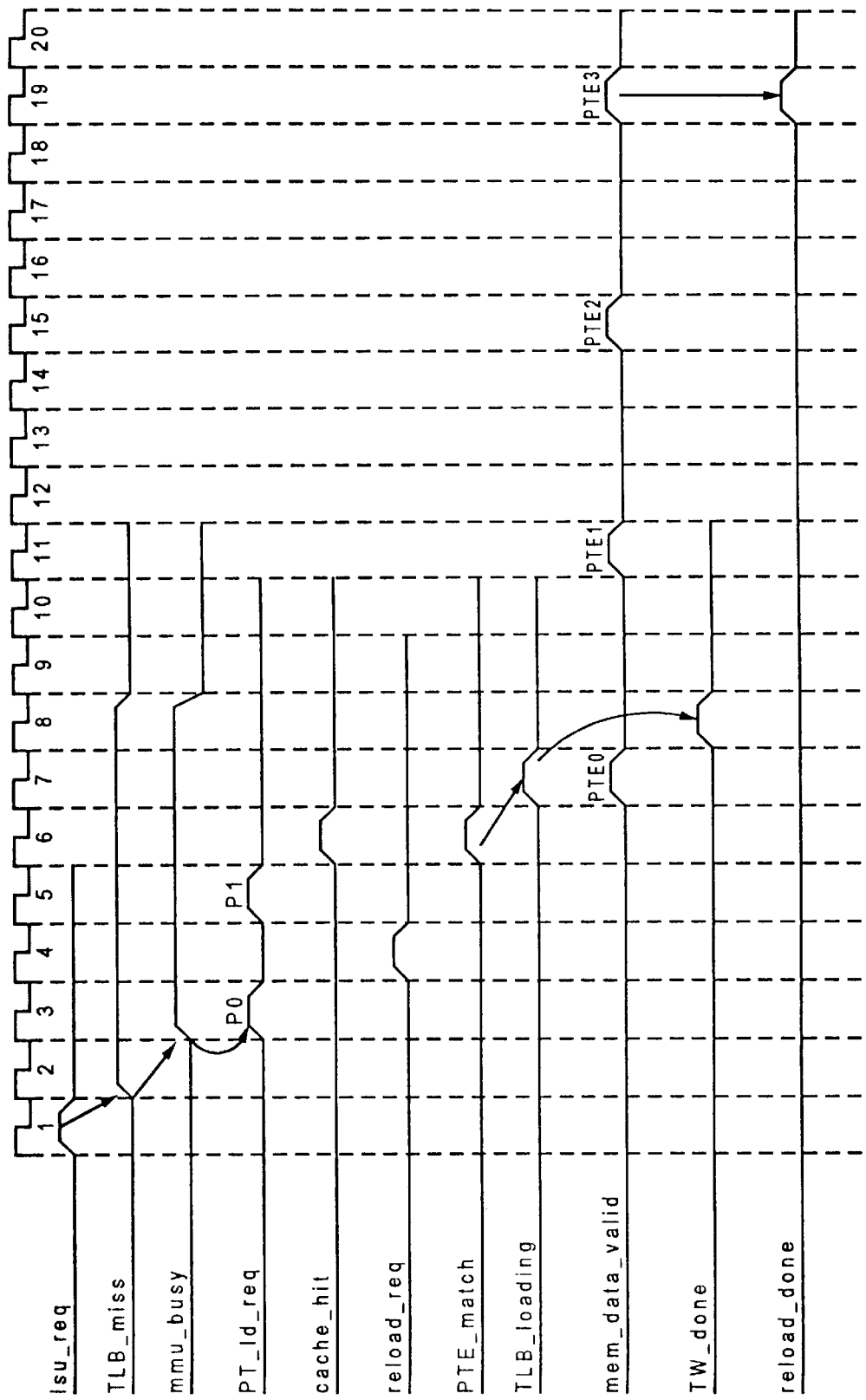
FIG. 7 illustrates a timing diagram of an exemplary table search operation performed in accordance with the method depicted in FIGS. 6A–6D.

With reference now to FIG. 7, there is illustrated a timing diagram of an exemplary table search operation in accordance with the method depicted in FIGS. 6A–6D. As illustrated, an address translation request is received by DMMU 100 from LSU 28 in cycle 1. DMMU 100 determines that the required PTE is not resident within DTLB 104 at the beginning of cycle 2, and as a result, asserts a busy signal during cycles 3–8.

During cycle 3, DMMU 100 requests the first PTE in set P0 of the primary PTEG from data cache 90. In response to a cache miss in cycle 4, DMMU 100 issues a reload request to main memory 50 requesting set P0. Next, in cycle 5, DMMU 100 requests the first PTE within set P1 from data cache 90. In response to a P1 cache hit during cycle 6, DMMU 100 compares PTE4, the first PTE in set P1, with the virtual address to be translated. In response to a detection of a match at cycle 6, PTE4 is loaded into the appropriate entry of DTLB 104 during cycle 7. Thereafter, the physical page number is extracted from the matching PTE and the address translation is completed during cycle 8.

As illustrated, the four PTEs within set P0 are loaded to data cache 90 from main memory 50 during cycles 7, 11, 15, and 19. If a table search operation were performed utilizing a conventional sequential search, set P1 would not be searched until each of PTE0–PTE3 of set P0 were searched. Thus, in the depicted scenario, the earliest cycle that a PTE match could be detected utilizing a conventional table search would be cycle 20 and the table search operation would not be completed until cycle 23. Therefore, in the depicted exemplary table search operation, utilizing the method depicted in FIGS. 6A–6B results in a savings of 15 cycles.

The illustrative embodiment of a data processing system hereinbefore described employs a improved method of address translation, which selectively searches PTEs in a nonsequential order during page table search operations in order to enhance processor performance. While an illustrative embodiment has been particularly shown and described, it will be understood by those skilled in the art that various changes in form and detail may be made therein without departing from the spirit and scope of the invention recited in the appended claims.

What is claimed is:

1. A method within a data processing system of translating a nonphysical address into a physical address, wherein said data processing system includes a first memory and a second memory, said method comprising:

determining if a first entry set which could contain a particular entry is stored within said first memory of said data processing system, wherein said particular entry associates a selected nonphysical address with a corresponding physical address;

in response to a determination that said first entry set is not stored in said first memory, loading said first entry set into said first memory from said second memory and determining if a second entry set which could contain said particular entry is stored within said first memory;

in response to a determination that said second entry set is stored in said first memory, initiating a search of said second entry set to locate said particular entry; and in response to locating said particular entry, translating said selected nonphysical address into said corresponding physical address utilizing said particular entry.

2. The method of claim 1, said data processing system including a processor, wherein said steps of determining whether said first entry set and said second entry set are stored within said first memory comprise determining whether said first entry set and said second entry set are resident within a cache memory associated with said processor.

3. The method of claim 1, said data processing system including a processor having a buffer for storing one or more entries, said method further comprising:

prior to said step of determining if said first entry set is resident within said cache memory, determining if said particular entry is contained within said buffer in said processor.

4. The method of claim 1, and further comprising:

in response to said first entry set being loaded into said first memory during said search of said second entry set, searching said first entry set for said particular entry prior to completing said search of said second entry set.

5. The method of claim 1, and further comprising:

in response to a determination that said first entry set is stored within said first memory, searching said first entry set for said particular entry prior to searching said second entry set.

6. The method of claim 1, wherein said physical address is assigned to an input-output device in said data processing system.

7. An apparatus within a data processing system for translating a nonphysical address into a physical address, said data processing system including a first memory and a second memory, said apparatus comprising:

means for determining if a first entry set which could contain a particular entry is stored within said first memory of said data processing system, wherein said particular entry associates a selected nonphysical address with a corresponding physical address;

means for loading said first entry set into said first memory from said second memory in response to a determination that said first entry set is not stored within said first memory;

means for determining if a second entry set which could include said particular entry is stored within said first memory in response to a determination that said first entry set is not stored in said first memory;

means for initiating a search of said second entry set to locate said particular entry in response to a determination that said second entry set is stored in said first memory; and means for translating said selected nonphysical address into said corresponding physical address utilizing said particular entry in response to locating said particular entry.

8. The apparatus of claim 7, said apparatus including a processor having a cache memory associated therewith, wherein said means for determining whether said first entry set is stored within said first memory and said means for determining whether said second entry set is stored within said first memory comprise means for determining whether said first entry set and said second entry set are resident within said cache memory associated with said processor.

9. The apparatus of claim 7, said apparatus including a processor having a buffer for storing one or more entries, said apparatus further comprising:

means for determining if said particular entry is contained within said buffer in said processor.

10. The apparatus of claim 7, and further comprising:

means for searching said first entry set for said particular entry prior to completing said search of said second entry set in response to said first entry set being loaded into said first memory during said search of said second entry set.

11. The apparatus of claim 7, and further comprising:

means for searching said first entry set for said particular entry prior to searching said second entry set in response to a determination that said first entry set is stored within said first memory.

12. The apparatus of claim 7, wherein said physical address is assigned to an input-output device in said data processing system.

13. A data processing system, comprising:

a first memory and a second memory; and a processor, including:

a memory management unit, wherein said memory management unit translates a selected nonphysical address utilized by said processor into a corresponding physical address utilizing a particular entry that associates said selected nonphysical address and said corresponding physical address, wherein said memory management unit (i) searches a second entry set stored in said first memory that could include said particular entry and (ii) loads a first entry set into said first memory from said second memory, both (i) and (ii) occurring in response to a determination that said first entry set which could include said particular entry is not stored within said first memory.

14. The data processing system of claim 13, said memory management unit further comprising:

a buffer for storing one or more entries, wherein said memory management unit determines if said buffer contains said particular entry prior to searching said first or said second entry sets.

15. The data processing system of claim 13, wherein said memory management unit searches said first entry set for said particular entry prior to completing said search of said second entry set in response to receipt of said first entry set from said second memory.

16. The data processing system of claim 13, wherein said memory management unit searches said first entry set for said particular entry prior to searching said second entry set in response to a determination that said first entry set is stored within said first memory.

17. The data processing system of claim 13, wherein said physical address is assigned to an input-output device within said data processing system.

* * * * *